Oct. 20, 1959     A. J. W. M. VAN OVERBEEK     2,909,732
DEVICE FOR MAINTAINING MECHANICAL OSCILLATIONS
Filed Oct. 27, 1955

INVENTOR
ADRIANUS JOHANNES WILHELMUS
MARIE VAN OVERBEEK

BY
AGENT

United States Patent Office 2,909,732
Patented Oct. 20, 1959

2,909,732

DEVICE FOR MAINTAINING MECHANICAL OSCILLATIONS

Adrianus Johannes Wilhelmus Marie van Overbeek, Eindhoven, Netherlands, assignor, by mesne assignments, to North American Philips Company, Inc., New York, N.Y., a corporation of Delaware Application October 27, 1955, Serial No. 543,211

Claims priority, application Netherlands November 6, 1954

4 Claims. (Cl. 331—116)

This invention relates to devices for maintaining mechanical oscillations in oscillatory systems comprising a permanent magnet, a coil and an amplifier, whereby the permanent magnet which moves with respect to the coil in conformity with the oscillation induces voltage pulses in the coil, which supplies corresponding driving force pulses via the amplifier back to the system. The object of the invetnion is more particularly to provide a device in which the energy required for maintaining the mechanical oscillations is supplied to the system by very simple means and for this purpose it is characterized in that the amplifier is blocked during the intervals between the voltage pulses and is connected to the coil in such manner that, when released by the said voltage pulses, it operates as an impedance having a negative resistance portion parallel to the coil.

The invention may be realized in a particularly advantageous manner in combination with a transistor amplifier which, in the absence of the base-emitter biassing voltage source already has a natural input threshold voltage blocking the transistor, said blocking being eliminated by the voltage pulses produced in the coil.

In order that the invention may be readily carried into effect, it will now be described, by way of example, with reference to the accompanying drawing, in which Fig. 1 shows one embodiment according to the invention.

Figure 1:
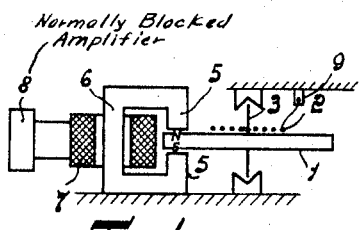
Figure 2:
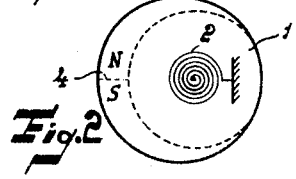
Fig. 2 is a plan view on a part of Fig. 1.

The device shown in Fig. 1 comprises a circular disc-shaped permanent magnet 1 which, together with a spring 2, constitutes a system which can oscillate about a shaft 3. The spring is connected at its inner end to the shaft 3 and at its outer end to a fixed point 9 as shown. The permanent magnet 1 is, for example, magnetized in the axial direction, the direction of the magnetisation at the area 4 abruptly reversing in the manner shown in Fig. 2, resulting in, for example, pole surfaces N and S of the form indicated by the dotted lines in Fig. 2. When the area 4 moves between limbs 5 of a weak-magnetic core 6 of a coil 7, the direction of the flux through the core 6 reverses and hence a voltage pulse is produced in the coil 7, which pulse may be supplied, after being amplified, to a driving system for maintaining the oscillating movement.

According to the invention, for this purpose, an amplifier which is naturally blocked is connected to the coil in such manner that it is released upon occurrence of said voltage pulses of appropriate polarity and then operates as an impedance 8 having a negative resistance portion parallel to the coil. The voltage pulses produced in the coil 7 are of one determined polarity when the magnet 1 rotates in one direction and of the opposite polarity when said magnet rotates in the opposite direction, the amplifiers shown on Figs. 3, 4, 6 and 7 are thus released once only for every complete oscillation of the magnet 1, when the area 4 passes between the limbs 5 in a determined direction. The variations of the flux produced during the rest of the movement of the magnet 1 are too slow to induce in the coil 7 a voltage sufficient to release the amplifier.

If a load having a positive resistance was connected across the coil 7, the magnet 1 would have to supply energy to said coil for producing a voltage pulse corresponding to the abrupt variation of the flux, the electromotive forces across the coil 7 and across the load would be of opposite directions and said last E.M.F. would induce a reaction flux of opposite direction through the core 6, so that the movement of the magnet would be decelerated by the passage of the area 4 between the limbs 5. However, as soon as the amplifier is released by a voltage pulse of the appropriate polarity, the coil 7 becomes practically connected to a negative resistance, so that the direction of the reaction flux induced through the core 6 is reversed. This reaction flux is principally produced by energy delivered by the amplifier and induces on the limbs 5 of the core 6 magnetic poles of such polarity, that they impart a driving impulse to the magnet 1, thus maintaining the mechanical oscillations of the system.

Circuits exhibiting a negative resistance and comprising amplifying elements are widely known in telephone and telegraph engineering.

Figure 3:
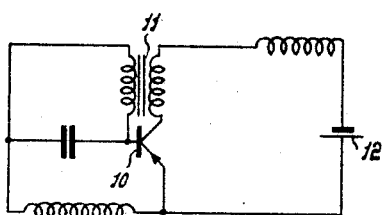
Figs. 3 and 4 show two circuits of the univibrator type for use in a device as shown in Fig. 1.
Figure 4:
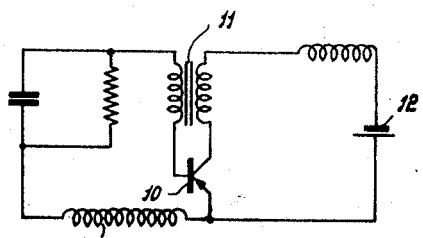

Figs. 3 and 4 show two embodiments of such circuits of the monostable trigger or univibrator type. The coil 7 shown diagrammatically, is included in the emitter-base circuit of a transistor 10 which is coupled back by means of a collector-base feedback transformer 11 in such manner that when a transient voltage pulse of the appropriate polarity occurs across the coil 7, the transistor 10 momentarily becomes conducting and, as a result of said backcoupling, delivers a pulsatory collector current but returns to its substantially blocked condition after the pulse across the coil 7 has ended. The circuit of Fig. 3 thus behaves as a negative resistance parallel to the coil 7.

Figure 5:
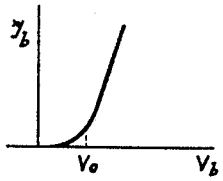
Fig. 5 shows a characteristic curve to explain Figs. 3 and 4.

An advantageous use is made of the property of transistors that the characteristic (see Fig. 5) showing the base current $I_b$ as a function of the base voltage $V_b$ in the absence of an emitter-base biassing potential source already naturally has a certain threshold voltage $V_o$ which ensures that only with a voltage across the coil 7 larger than the threshold voltage $V_o$, the transistor 10 has an amplification sufficiently high to bring about self-oscillation.

Figure 6:
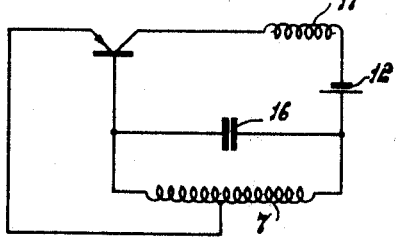
Figs. 6 and 7 show two circuits of the sine-oscillator type for use in a device as shown in Fig. 1.
Figure 7:
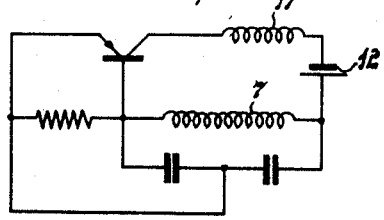

In the circuits shown in Figs. 6 and 7, the coil 7 itself is included in oscillatory circuits known per se, in which a capacitor 16 and the coil 7 determine the frequency of the oscillations produced across the coil 7 during the induced voltage pulse. As a result of these oscillations, an average collector-current pulse flows, which is considerably larger than, and corresponds to, the initial pulse produced across the coil 7. The damping of the circuit must be so great and the voltage source 12 must be so small that, after the voltage pulse across the coil 7 has ended, the oscillation is immediately extinguished, which means that during the periods in which the transistor is released by the voltage pulses, the amplitude of the amplified voltages produced as a result of the negative resistance of the circuit still remains so small that the transistor cannot self-oscillate during the intervals between said voltage pulses. A coil 17 may serve to drive an index system for time indication.

Instead of the transistor amplifiers shown, use could be made of electron tube amplifiers normally cut off by a grid-biassing potential source. As a further alternative, rectifiers or other impedances having a negative internal resistance might be used as amplifiers. Furthermore, it would be possible to arrange for the coil 7 to perform the oscillating movement and the permanent magnet 1 to occupy a fixed position, although this would result in more complicated constructions.

What is claimed is:

1. Apparatus for maintaining mechanical oscillations, comprising a coil, a permanent magnet rotatively mounted in operative relation to said coil and adapted to produce an electric pulse in said coil, and means responsive to said pulse for exerting a driving force pulse upon said magnet thereby to sustain said magnet in oscillatory motion relative to said coil, said pulse responsive means comprising a regenerative feedback amplifying system for said pulse connected across the output of said coil, said amplifying system being normally blocked and being responsive to said pulse to produce a negative resistance in parallel with said coil.

2. Apparatus as claimed in claim 1, wherein said amplifying system comprises a transistor having emitter, collector and base electrodes, means forming an emitter-base input circuit and an emitter-collector output circuit, said coil being connected in said emitter-base circuit, and feedback coupling means between said output and input circuits.

3. Apparatus as claimed in claim 1, wherein said amplifying system comprises a transistor having emitter, collector and base electrodes, means forming a collector-base circuit, and a resonant circuit included in said collector-base circuit, said resonant circuit including said coil.

4. Apparatus for maintaining mechanical oscillations, comprising a single coil, a permanent magnet rotatively mounted in operative relation to said coil and adapted to produce an electric pulse in said coil, and means responsive to said electric pulse for exerting a driving force pulse upon said magnet thereby to sustain said magnet in oscillatory motion relative to said coil, said electric pulse responsive means comprising an amplifying system for said electric pulse connected across the output of said coil, said amplifying system comprising a normally blocked transistor circuit, said transistor circuit being responsive to said electric pulse to produce a negative resistance in parallel with said coil whereby said transistor circuit self-oscillates at a frequency different from the repetition frequency of said pulse and at a relatively small amplitude of oscillation thereby quenching electrical oscillations during the time intervals between said electric pulses.

References Cited in the file of this patent

UNITED STATES PATENTS

| 1,958,071 | Scofield | May 8, 1934 |
| 2,769,946 | Brailsford | Nov. 16, 1956 |

FOREIGN PATENTS

| 1,090,564 | France | Oct. 20, 1954 |